United States Patent
Brümmer et al.

[11] Patent Number: 5,358,354
[45] Date of Patent: Oct. 25, 1994

[54] RESILIENT COUPLING

[75] Inventors: Michael Brümmer, Laudenbach; Volker Daume, Hirschhorn; Bernhard Gesenhues, Birkenau, all of Fed. Rep. of Germany

[73] Assignee: Firma Carl Freudenberg, Weinheim, Fed. Rep. of Germany

[21] Appl. No.: 32,896

[22] Filed: Mar. 18, 1993

[30] Foreign Application Priority Data

Mar. 25, 1992 [DE] Fed. Rep. of Germany ....... 4209608

[51] Int. Cl.$^5$ .............................................. F16B 21/18
[52] U.S. Cl. ................................... 403/326; 403/379; 403/321
[58] Field of Search ............... 403/326, 325, 378, 379, 403/155, 287, 329, 328, 376, 377, 324, 321

[56] References Cited

U.S. PATENT DOCUMENTS

| | | | |
|---|---|---|---|
| 2,013,962 | 9/1935 | Hutchens | 403/379 |
| 2,675,256 | 4/1954 | Cornell | 403/379 |
| 2,926,033 | 2/1960 | Zarrillo | 403/326 |
| 3,298,072 | 1/1967 | Whalen | 403/326 |
| 3,298,409 | 1/1967 | Elson | 403/326 X |
| 3,471,186 | 10/1969 | Luebbert et al. | 403/326 X |
| 4,014,219 | 3/1977 | Feustel et al. | 403/378 X |
| 4,192,220 | 3/1980 | Tateoka | 403/326 X |
| 4,344,516 | 8/1982 | Kolb | 403/379 X |
| 4,505,058 | 3/1985 | Peterson | 403/326 X |
| 5,000,614 | 3/1991 | Walker et al. | 403/326 |

FOREIGN PATENT DOCUMENTS 3607811 9/1987 Fed. Rep. of Germany .

Primary Examiner—Randolph A. Reese
Assistant Examiner—Harry C. Kim
Attorney, Agent, or Firm—Kenyon & Kenyon

[57] ABSTRACT

A coupling comprising a first machine element having a recess, a second machine element which can be inserted into the recess and an elastic, U-shaped bracket, adjacent positioning devices being associated with the first and the second machine elements and the bracket having a direction of movement which extends transverse to the direction of coupling and being able to be brought into engagement with the positioning devices. The first machine element has in the region of its positioning devices in the direction of movement of the bracket at least two detents located one behind the other which are arranged in the direction of movement in front of and behind the recess for the second machine element. The bracket is provided in the direction of movement at least at its front end with a lock device which can be brought into engagement with the detents of the first machine element. The bracket can in retracted condition be brought into engagement with the first detent and is then arranged outside the recess.

6 Claims, 3 Drawing Sheets

RESILIENT COUPLING

BACKGROUND OF THE INVENTION

The present invention relates generally to resilient couplings, and, more particularly, to a resilient coupling comprising a first machine element having a recess, a second machine element which can be inserted into the recess and an elastic, U-shaped bracket. The U-shaped bracket couples the first and second machine elements by being moved in a direction transverse to the direction of coupling. In an assembled condition, the U-shaped bracket engages positioning portions of the first and second machines elements, thereby connecting them together.

Such a coupling is known from German published patent application DE-OS 3607811. In that coupling, a U-shaped bracket, which consists of wire, passes with its legs through first and second machine elements and thereby fixes the axial position of the elements with respect to each other. In this prior art coupling, automated assembly can be effected only with considerable expense since the parts must be connected to each other in succession. Furthermore, the prior art connection is characterized by relatively poor efficiency, particularly with respect to the costs of material and manufacture.

SUMMARY OF THE INVENTION

It is an object of the present invention to develop further such a coupling, so that it can be assembled simply and so that assembly can be automated in a particularly simple manner. It is another object of the present invention to provide a coupling that is characterized by low cost of material and manufacture.

These objects are achieved by a coupling comprising a first machine element having positioning portions wherein at least two detents are provided. The detents are located one behind the other in the direction of movement of a U-shaped bracket. At least one detent is arranged in front of a recess in the first machine element for receiving a second machine element, and at least one detent is arranged behind the recess for the second machine element. The bracket is provided with a lock device which can be brought into engagement with the detents of the first machine element, so that in a retracted preassembled condition the bracket can be brought into engagement with the first detent and in a second, assembled position the bracket can be brought into engagement with the second detent.

It will be appreciated by one skilled in the art that the connection of the present invention can be assembled very easily. In a first assembly step, the bracket is brought into engagement with the first detent of the first machine element. This step can take place either before or after the installation of the second machine element in the recess of the first machine element. With the second machine element positioned in the recess of the first machine element, the bracket is moved in a second assembly step in the direction of the second detent. The bracket is guided in the direction of movement by the positioning portions of the first and second machine elements, which may be formed as grooves, until the lock device of the bracket engages the second detent. The second detent can be formed, for example, by an edge of the first machine element at the end of the positioning portion. With the lock device of the bracket engaging the second detent, the two machine elements are fixed with respect to each other in both the radial and axial directions.

It will be appreciated that it is advantageous that at least the bracket and first machine element can be made of the same material. This results in particularly low costs of material for the coupling and recycling advantages.

In accordance with another advantageous embodiment, the ends of the bracket are hook-shaped to form the lock devices and the detents are developed as recesses in the first machine element. In a variation of this embodiment, the bracket can have engagement recesses which can be brought into engagement with hook-shaped detents of the first machine element. Depending on the circumstances of the particular application, a coupling can be provided which can be manufactured in particularly economical manner.

The bracket can have at least one disassembly recess at each of its front ends. These recesses can be formed by holes into which a tool (e.g. pliers) can engage for the disassembly of the coupling. In addition to simple manufacture and problem-free assembly of the coupling, this feature results in simple disassembly.

In order to better compensate for manufacturing tolerances in the height of the positioning portions of the two machines elements, the bracket can be made undulated. An undulated bracket assures a good axial fit of the two machine elements in their assembled condition without it being necessary for the two machine elements and/or the bracket to be manufactured with particularly close tolerances.

In addition to the undulated configuration of the bracket, the legs of the U-shaped bracket can have a continuously increasing distance between them in a direction away from the base. As a result of this configuration, the two machine elements are fixed under initial stress after assembly in axial and radial direction within each other.

With a view toward low cost of material and manufacture, the bracket can consist of an elastically deformable material, for instance, a polymer material. The bracket can be manufactured at the same time as the first machine element which can also consist of polymer material.

Further advantages of the present invention will be explained below with reference to the drawings.

DETAILED DESCRIPTION OF A PREFERRED EMBODIMENT

Figure 1:
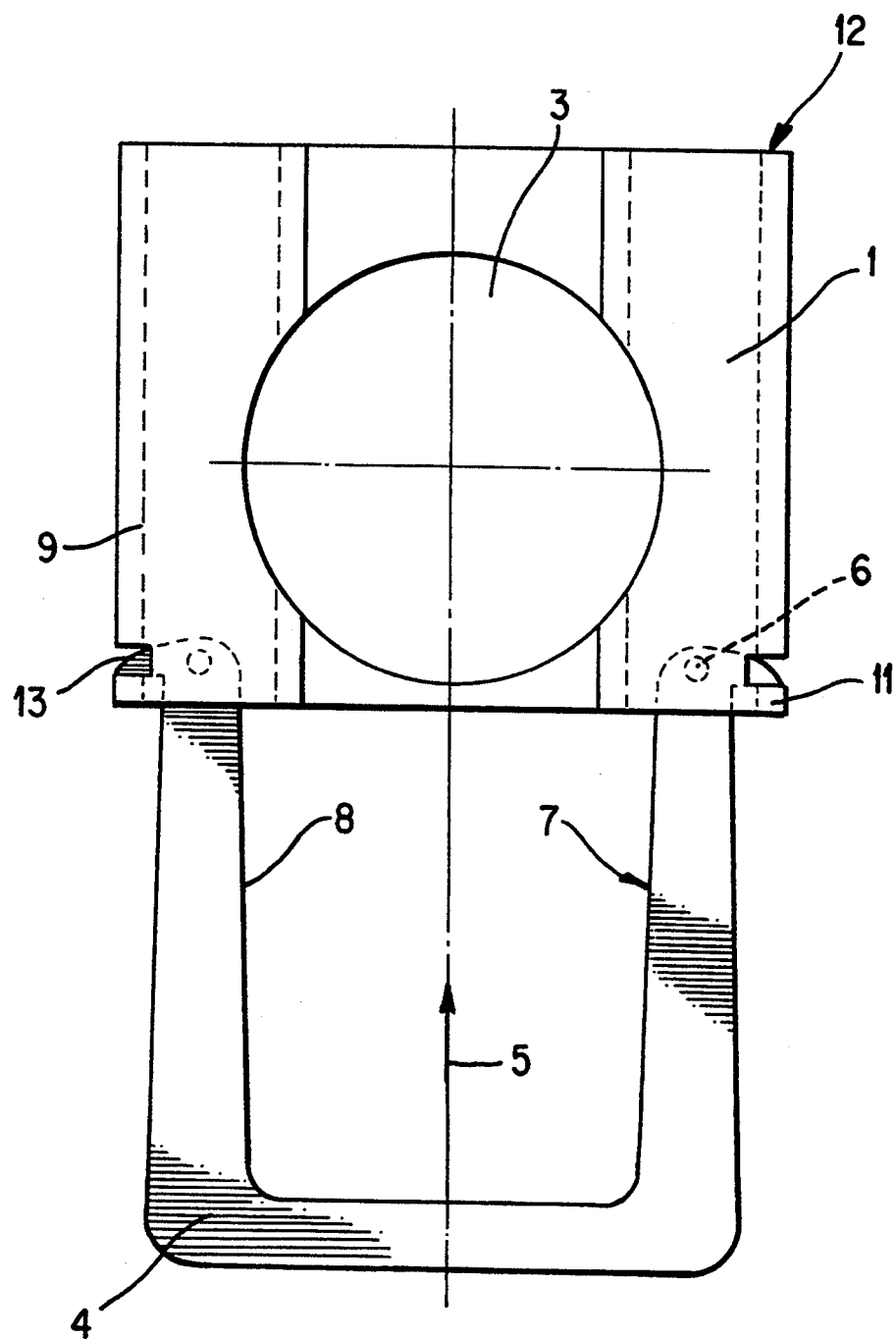
FIG. 1 shows a top view of a first machine element and a bracket in a preassembled position.

FIG. 1 shows a first machine element 1 having a recess 3 and positioning devices formed as grooves 9. A pair of first detents 11 are formed as recesses in the first machine element 1, and a pair of second detents 12 are formed by the housing of the first machine element 1. This embodiment can be manufactured in a particularly simple and economical manner.

Figure 2:
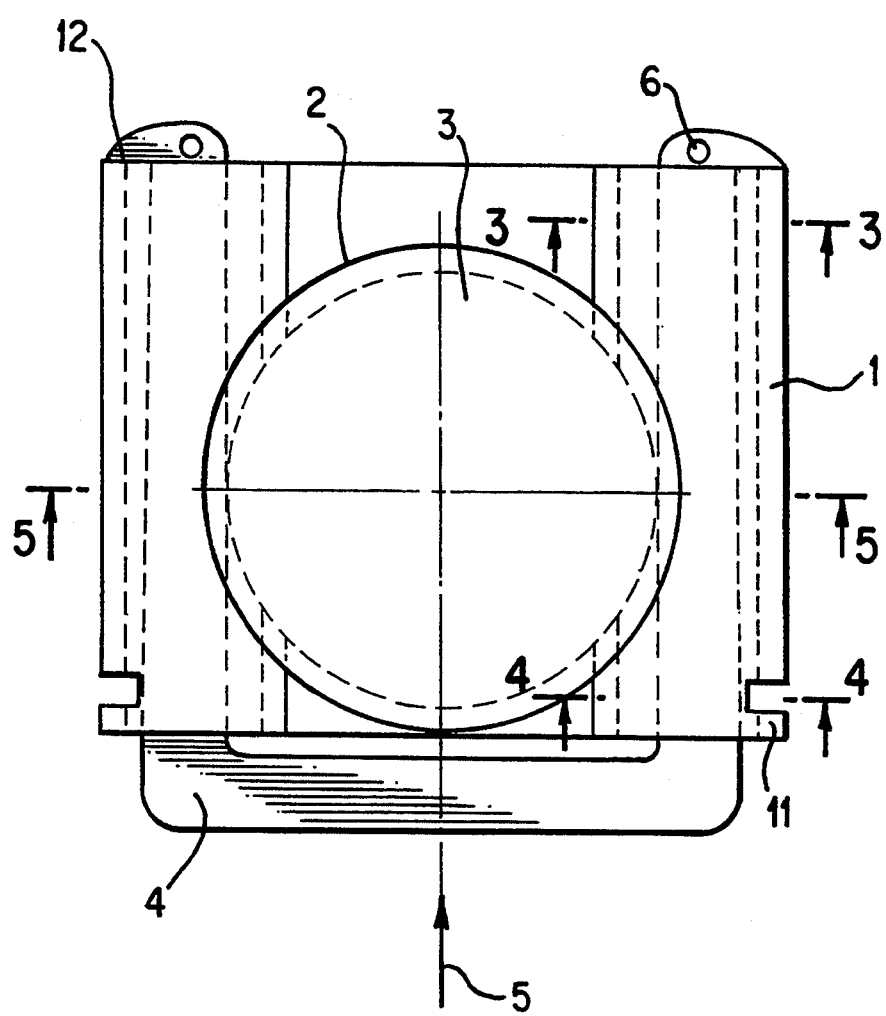
FIG. 2 shows a top view of a second machine element inserted in the first machine element of FIG. 1 with both machine elements being fixed in position by the bracket in an assembled position.

A bracket 4, the ends of which are hook-shaped to form a lock devices 13, is shown in FIG. 1 in engagement with the first detents 11 of the first machine element 1. In this preassembled condition, the bracket 4 does not obstruct the recess 3 in the first machine element 1 so that, as shown in FIG. 2, a second machine element 2 can be inserted into the recess 3. The ends of the bracket 4 as well as the detents 11, 12 which are positioned one behind the other in the direction of movement 5, can also be developed differently in accordance with the particular application.

FIGS. 2 through 5 show the final assembled state, the second machine element 2 inserted into the recess of the first machine element 1. Both the first machine element 1 and the second machine element 2 have groove-shaped positioning devices 9, 10 which are developed to face each other and accommodate the bracket 4. (See FIG. 5). In the assembled position, the bracket 4, which consists of resilient polymer material, engages the second detent 12 of the first machine element 1. With the bracket 4 inserted, the two machine elements 1 and 2 are fixed in position with respect to each other.

Disassembly recesses 6 at the front end of the bracket 4 are arranged so that they can be readily reached by a disassembly tool. For the disassembly of the second machine element 2, it is necessary merely to disengage the bracket 4 from the second detent 12 and to pull it back opposite the direction of movement 5. The opposite surfaces 7, 8 of the bracket 4 can be constructed to have a continuously increasing distance from each other in the direction of movement 5, so that upon withdrawal of the bracket 4 the connection between the first and second machine elements 1 and 2 is initially loosened. The bracket 4 completely releases the second machine element 2 if it is pulled back to engage the first detents 11.

To completely remove the bracket 4 from the first machine element 1, the bracket 4 can be elastically deformed inward and then pulled out. In accordance with another embodiment of the bracket, it can have additional disassembly recesses in its rear area so that the bracket 4 can be removed with the same tool used to engage the front disassembly recesses 6.

The hook-shaped ends 13 of the bracket 4 are developed in such a manner that a dependable attachment of the bracket 4 on the first machine element 1 is assured. The resting surfaces of the hooks can form with the resting surfaces of the first machine element 1 an angle of 2 to 15 degrees for the better clamping of the bracket 4.

Figures 3, 4:
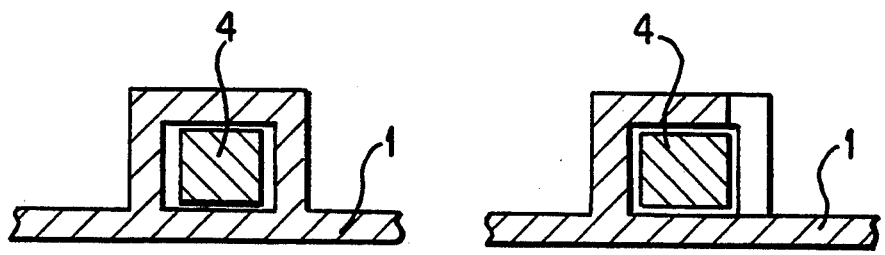
FIG. 3 shows a cross-sectioned view of the first machine element with the bracket inserted taken along the line 3—3 in FIG. 2.
FIG. 4 shows another cross-sectional view of the first machine element with the bracket inserted, taken along the line 4—4 in FIG. 2.
Figure 5:
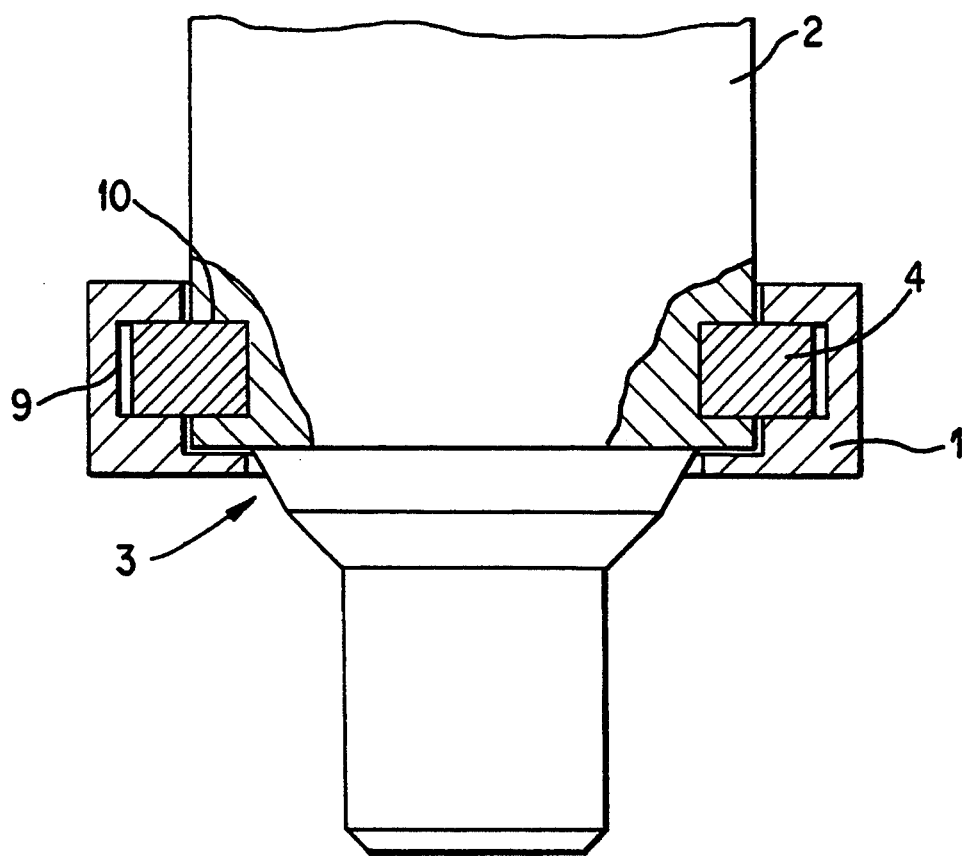
FIG. 5 shows a cross-sectional view of the coupling taken along the line 5—5 in FIG. 2.

FIG. 3 shows a cross-sectional view 3—3 in FIG. 2, showing a leg of the bracket 4 within a positioning portion of the first machine element 1. FIG. 4 shows a cross-sectional view along the line 4—4 in FIG. 2, showing the region of a first detent 11 which, prior to the assembly of the second machine element 2, is in engagement with a hook-shaped end 13 of the bracket 4.

The present invention makes it possible, when the bracket 4 is in engagement with the first detents 11, for the second machine element 2 to be assembled without the bracket 4 having to be entirely removed. This facilities handling in general and in particular automatic assembly.

The bracket 4 can be produced in the same mold in which the first machine element 1 is produced, so that in addition to low material costs there are also low manufacturing costs.

The scope of the invention is not limited to the described embodiments, as other variations are possible within the scope of the appended claims.

What is claimed is:

1. A coupling comprising:
    a first machine element having a recess,
    a second machine element which can be inserted into the recess,
    an elastic, U-shaped bracket, comprising first and second axial legs and a base, and
    first and second adjacent positioning devices integral with the first and second machine elements, respectively,
    wherein the bracket has a direction of movement extending transverse to a direction of coupling and is able to be brought into engagement with the positioning devices,
    wherein the first machine element has in the region of its positioning devices in the direction of movement of the bracket at least a first and a second detent located one behind the other,
    wherein the first and second detents are arranged in the direction of movement in front of and behind the recess of the first machine element, respectively,
    wherein the bracket is provided in the direction of movement at least at a front end of at least one of said first and second axial legs with a lock device which can be brought into engagement with the detents of the first machine element,
    wherein the bracket can in a retracted condition be brought into engagement with the first detent, so that the bracket is arranged outside the recess,
    wherein the lock device faces outwardly with respect to a longitudinal axis of said bracket, and
    wherein the first detent faces inwardly toward said recess of said first machine element so that in said retracted condition said lock device is biased outwardly from said longitudinal axis of said bracket to engage said first detent.

2. A coupling according to claim 1, wherein at least one of the positioning devices is formed as groove.

3. A coupling according to claim 1, wherein ends of the axial legs of the U-shaped bracket are hook-shaped and wherein the first detent is formed as a recess.

4. A coupling according to claim 1, wherein the U-shaped bracket has at its front ends of its axial legs at least one disassembly recess each.

5. A coupling according to claim 1, wherein the U-shaped bracket has a continuously increasing distance between mutually opposing inner surfaces of the axial legs in the direction of movement.

6. A coupling according to claim 1, wherein the bracket comprises a polymer material.

* * * * *